(12) United States Patent
Avitzur et al.

(10) Patent No.: US 7,904,889 B2
(45) Date of Patent: Mar. 8, 2011

(54) BUSINESS PROCESS MODEL DEBUGGER

(75) Inventors: Aharon Avitzur, Ramat Efal (IL); Alla Volkov, Netanya (IL); Barak Naveh, Hod Hasharon (IL); Wasim Sadiq, Westlake (AU); Marc Loxton, Greenbank (AU); Mohammed Abdullah, Bellbowrie (AU)

(73) Assignee: SAP AG, Walldorf (DE)

( * ) Notice: Subject to any disclaimer, the term of this patent is extended or adjusted under 35 U.S.C. 154(b) by 1283 days.

(21) Appl. No.: 11/478,668

(22) Filed: Jun. 30, 2006

(65) Prior Publication Data
US 2008/0004856 A1    Jan. 3, 2008

(51) Int. Cl.
G06F 9/44    (2006.01)
(52) U.S. Cl. .......................... 717/128; 717/125; 717/127
(58) Field of Classification Search .................... None
See application file for complete search history.

(56) References Cited

U.S. PATENT DOCUMENTS

| | | | |
|---|---|---|---|
| 6,671,830 B2 * | 12/2003 | Kaler et al. | 714/39 |
| 6,697,810 B2 * | 2/2004 | Kumar et al. | 1/1 |
| 2003/0236677 A1 * | 12/2003 | Casati et al. | 705/1 |
| 2005/0060048 A1 * | 3/2005 | Pierre et al. | 700/28 |
| 2005/0071243 A1 * | 3/2005 | Somasekaran et al. | 705/26 |
| 2005/0120332 A1 * | 6/2005 | Martin et al. | 717/105 |
| 2006/0190929 A1 * | 8/2006 | Bennett et al. | 717/124 |
| 2006/0288332 A1 * | 12/2006 | Sagar et al. | 717/124 |

OTHER PUBLICATIONS

Van der Aalst, W., et al., Workflow Mining: Discovering Process Models from Event Logs, IEEE Transactions on Knowledge and Data Engineering, vol. 16, No. 9 (Sep. 2004), pp. 1128-1142.*

* cited by examiner

Primary Examiner — Tuan Q Dam
Assistant Examiner — Todd Aguilera
(74) Attorney, Agent, or Firm — Fish & Richardson P.C.

(57) ABSTRACT

Methods, systems, and computer program products for performing the method are provided. The method includes collecting specified events generated during a run-time operation of a designed computing process flow having a model that defines, at a service-oriented architecture level, which of several predefined computing services are used in the computing process flow and relationships among the predefined computing services that are used in the process flow. The method also includes generating, on a display device, a visual display that shows visual representations of all or a portion of the service-oriented architecture-level model for the computing process flow, and of the collected specified events and where, relative to the model, the collected specified events were generated.

20 Claims, 7 Drawing Sheets

BUSINESS PROCESS MODEL DEBUGGER

TECHNICAL FIELD

This invention relates to, for example, debugging business process models.

BACKGROUND

As businesses and other large organizations attempt to increase efficiency and reduce costs by streamlining their processes, some have modeled their business processes using software models. Certain of these software models use Service-oriented architecture (SOA) to describe business processes. Developers can use SOA architecture to graphically display a modeled business at a conceptual level above a language-specific implementation that includes particular class objects and methods. This higher conceptual level describes business tasks, or "services," that are repeated by the business, such as loading or unloading stock, updating inventory, etc.

During a debugging or reengineering phase for the software, the software can be executed in real-time, and the events that result from the execution are captured. In some systems developers make modifications to the executed software based on the captured events. In some systems, however, the developers abandon the previously generated SOA model used to design the software in favor of focusing on run-time events directly. One reason for this may be that there is no convenient integration between the run-time events generated by the business processes and the previously designed SOA software model that describes these processes.

SUMMARY

This document discloses methods, systems, and computer program products for capturing events related to the run-time execution of business service processes, and displaying those events in a graphical and textual format so that a user may visualize the event with the associated service.

In one aspect, this document discloses a computer-implemented method of providing a visual display of a run-time operation of a computing process flow. The method includes collecting specified events generated during a run-time operation of a designed computing process flow, which has a model that defines, at a service-oriented architecture level, which of several pre-defined computing services are used in the computing process flow, and relationships among the predefined computing services that are used in the process flow. The method further includes generating, on a display device, a visual display that shows visual representations of all or a portion of the service-oriented architecture-level model for the computing process flow, and of the collected specified events, and where, relative to the model, the collected events were generated.

In various implementations of the computer-implemented method, one or more of the following features may be included. The generated visual display may be understandable without user knowledge of a software programming language. The user may specify run-time events to collect, and the run-time events may be executed across multiple application system instances, and on multiple server systems. Collected run-time events may be analyzed to determine if they were generated by a particular user. The user may modify the computing process flow or relationships among the pre-defined services based on the generated visual display.

In addition, the method may use metadata associated with the computing process flow to link the collected events with a corresponding computing process flow by matching a run-time method identifier with design-time metadata. The collected events may be translated into a universal programming language, such as extensible mark up (XML) language. The method may allow generating the visual display so that events are displayed in real-time upon the corresponding computing process flow. Collected specified events and the computing process flow may be displayed on a user interface that includes graphical indicators that highlight the computing process flow related to the collected events. Further, the method may display a process sequence of multiple computing process flow components with a collected specified event, allowing the user to select a level of process flow granularity at which the collected specified events and the computing process flow are displayed.

The visual display may show the interpolation of collected run-time events, the software models, and the interactions based on a filter criteria, based on associations occurring during a time period, associations between selected business objects, associations related to a selected business process, and associations occurring during a selected connection session.

In another aspect, this document further discloses a system for monitoring run-time events in association with process models. The system includes an event monitor to collect run-time events generated by system components represented using software models, a server for associating the monitored run-time events with the software models and interactions between the software models at a service-oriented architecture level, and an interface for transmitting an output for display comprising the associations between the collected run-time events, the software models, and the interactions.

In yet another aspect, a computer program product is provided that is tangibly embodied in an information carrier. The computer program product includes instructions that, when executed, perform operations for providing a visual display of a run-time operation of a computing process flow. The operations include collecting specified events generated during a run-time operation of a designed computing process flow, which has a model that defines, at a service-oriented architecture level, which of several predefined computing services are used in the computing process flow and relationships among the predefined computing services that are used in the process flow. The operations further include generating, on a display device, a visual display that shows visual representations of all or a portion of the service-oriented architecture-level model for the computing process flow, and of the collected specified events and where, relative to the model, the collected specified events were generated.

In various implementations, the computer program product may operate to perform one or more of the method features described in connection with the computer-implemented method.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
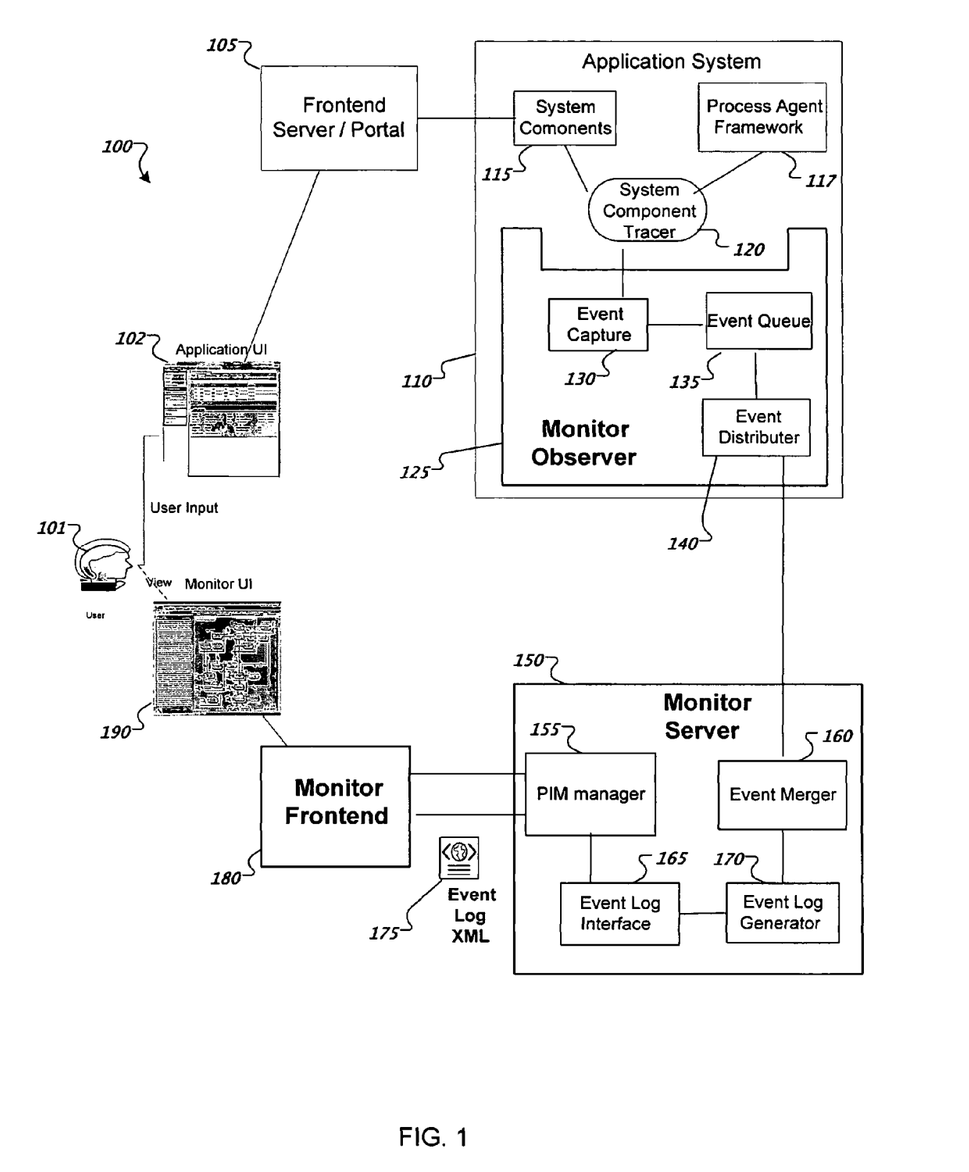
FIG. 1 is an example of a system for debugging business process models, according to one implementation.

FIG. 1 contains elements of a system for debugging business process models 100, according to one implementation. The system 100 may comprise an application user interface (UI) 102 with which a user 101 interacts with a computer program, a frontend server 105 which provides access to an application system 110, a monitor observer 125 which performs tasks relating to event capture and distribution, a monitor server 150 which receives, merges, and manages events, a monitor frontend 180 which captures events from the monitor server 150, and a monitor UI 190 which displays event information to the user 101.

In general, a user 101 may use the application UI 102 to interact with modeling programs, such as those that create business process models. In one implementation, the business process models may be of the Service Oriented Architecture type; an architectural programming style that provides businesses the ability to generate process flows among interacting software agents with an easy-to-use interface. A 'service' as used herein may be a unit of work done by a service provider module to achieve desired end results. The frontend server 105 may act as a link between the application UI 102 and the modeling program, which may exist as part of an application system 110. The application system 110 maybe comprised of system components 115, such as: an enterprise service framework, a process agent framework 117, a system components tracer 120 that keeps a detailed record of the steps undertaken during execution, and a monitor observer 125. The process agent framework allows the formation of integration scenarios by coupling process components via process integration logic. The integration logic is implemented within the process agent and is not distributed across application coding.

In one implementation, the monitor observer 125 may comprise three main elements: an event capture 130, an event queue 135, and an event distributor 140. The monitor observer 125 may run independently on every application system instance and can perform the function of watching ('listening') for new integration events logged by the system component tracer 120. In general, the types of integration events from the system component trace 120 may include: integration between UI and BO (business object), BO and BO, BO and outbound process agent (PA), PA to BO, and PA to PA. Event capture 130 may capture and analyze new integration events for a registered scenario test (e.g., a test for which a user 101 has set up). In a particular embodiment, the monitor observer 125 may conclude that one process agent sent information to another process agent (an 'event') by matching a run-time method ID with design-time metadata.

The event queue 135 queues the interaction events and passes them to the event distributor 140, and the event distributor posts the events to the monitor server 150.

Overall, the monitor server 150 can function as a listener for receiving the events from the monitor observer 125, and may do so on a continual basis or intermittently, at predefined times or time delays. The monitor server 150 comprises four main elements: an event merger 160, an event log generator 170, an event log interface 165, and a project integration manager (PIM) 155. Once the monitor server 150 receives events from the monitor observer 125, the event merger 160 may merge all integration events from different application systems into a merged event log. The event log generator 170 may compile the merged events in a pre-defined structure for use by the event log interface 165. Event logs may comprise scenario test integration events composed of the following elements: active components, integration events, and active sessions. Active components may include a list of the components that were activated during the scenario test, such as UI, BO, or PA component types. Integration events may include events between active component types (e.g., UI to BO, BO to BO, BP to PA, PA to BO, PA to PA); each integration event may comprise a 'from' and 'to' active component identification, as well as other information, such as service type (e.g., 'modify,' 'action,' 'PA call') and service name (e.g., 'create,' 'delete,' 'action name').

The event log interface 165 may receive events from the event log generator 170; the interface may comprise a module that parses an event log into a user-friendly structure for requested scenarios. To provide for universal program language interoperability, the PIM manager module 155 may translate captured events in the monitor server 150 into a well defined extensible mark-up language (XML) interface. XML promises a standard data format that can be shared easily across applications and especially by different organizations that need to share data. The PIM manager 155 may send XML-based event logs 175 to the monitor frontend 180 which generates the monitor UI 190. The PIM manager 155 may also receive XML-based event logs from the monitor frontend 180 during a test set-up; thus the PIM manager 155 serves as an XML translator and functions as an interface between the monitor UI and event logs, independent of programming language.

The system 100 may be used as a round-trip engineering debugging tool, where a user can design a process flow, monitor events in run-time, and redesign the process flow based on the visually displayed monitored events. For example, a user 101 can begin the debugging by activating the monitor observer 125. The user may execute an application that implements a previously designed process on a UI 102; the monitor observer 125 captures events related to the application, passes them to the monitor server 150, which in turn, can pass an XML-based log of captured events to a monitor front-end 180. The monitor front end 180 can then visually interpolate graphical or textual indications of captured events as associated with the service that spawned the event upon a modeling program monitor UI 190.

In one implementation, a user 101 may be engineering a business model using object-oriented programming methods. The user 101 may open a monitor UI 190 and specify a landscape to monitor, as well as a time interval to check for events that occur during run-time. The user 101 would then execute the business model on an application UI 102. As the business model executes, the monitor observer 125 may collect integration events and pass them to the monitor server 150. The monitor server 150 may filter the events captured by the monitor observer 125 and pass only those that occurred within the specified landscape of the logistic execution unit to the monitor frontend 180. The user 101 may then view captured events on the monitor UI 190, wherein the events are graphically represented on or near the programming object that caused the events to occur. Armed with this information, the user 101 may re-engineer the business model for improved functionality.

Figure 2:
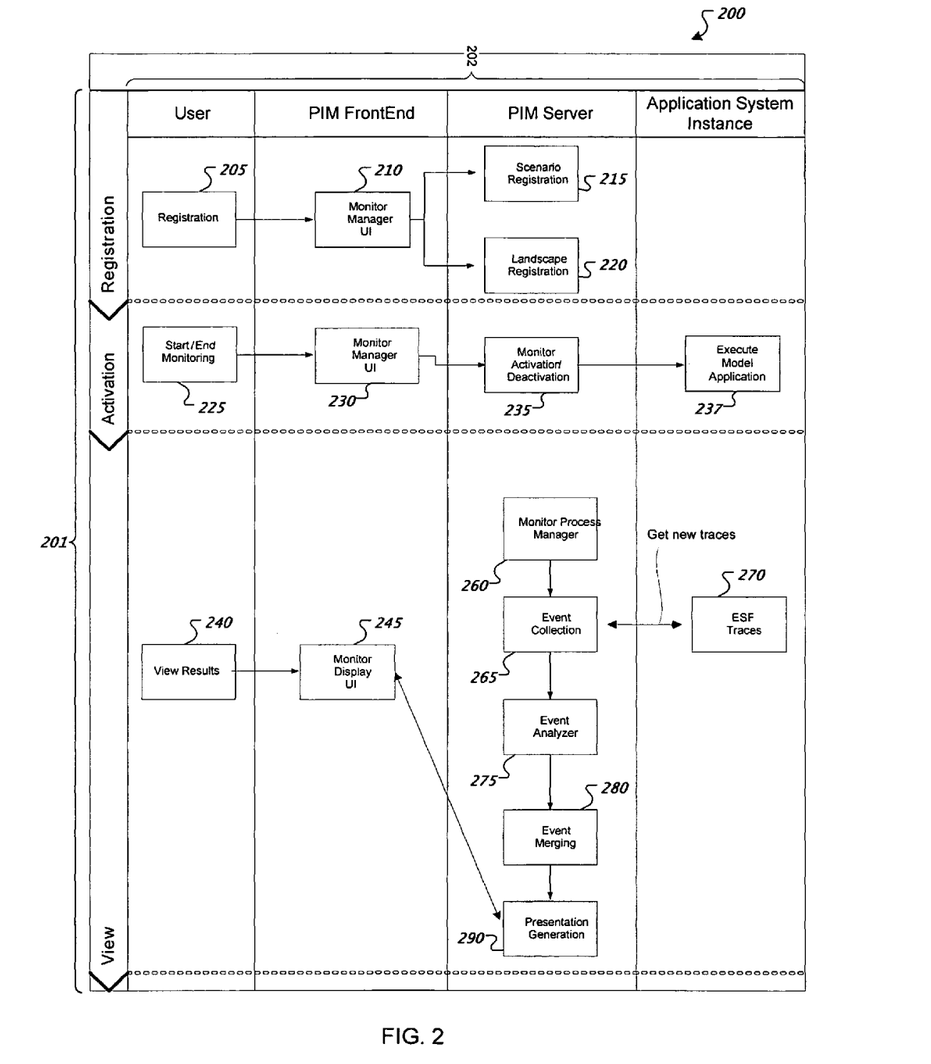
FIG. 2 is a sequence flow diagram outlining events of the business process model debugger.

FIG. 2 is a sequence flow diagram 200 outlining events of the business process model debugger. The diagram 200 comprises rows 201 representing three actions, according to one implementation: 'registration,' 'activation,' and 'view;' and columns 202 that represent the person or process that perform actions, according to one implementation: 'user,' 'PIM frontend,' 'PIM server,' and 'application system instance.'

The process 200 may begin by a user accessing a registration module 205 in which they may set various parameters, for example, the types of events they wish to capture, the frequency of capture, and the length of capture. This information may be passed to the monitor manager 210 on the PIM frontend module, which then sends appropriate information to register the scenario 215 and the landscape 220 for the events captured on the PIM server; i.e., the scenario and landscape define the limits of the events to be captured with respect to the type of data that the user desires.

Next, at step 225, the user may start (or end) the monitoring process as part of the activation step, which activates (or deactivates) the monitor manager 230 on the PIM frontend 180 and the monitor server 235. The activation step can turn the debugger 'on' in preparation for executing a model application, step 237, for which events are to be captured.

Once the application is running on the application system, events may be captured. To view the events, step 240, the user may utilize a monitor UI on the PIM frontend, step 245, which may be constantly updated with events in real time from the event log, or, alternatively, the user may wait until the application on the application system has finished executing to view results. On the monitor server at step 260, the monitor process manager may set the parameters for event collection. Next, at step 265, the event collector module may begin to receive events generated on the application system from the system component traces (step 270). At step 275, an event analyzer may scrutinize the contents of captured events to determine whether they should be included as set by the registration parameters; if they are to be included, the events are merged, step 280. Finally, at step 290, the merged events may be converted to an XML language interface for integration into the visual representation of the application.

Figure 3:
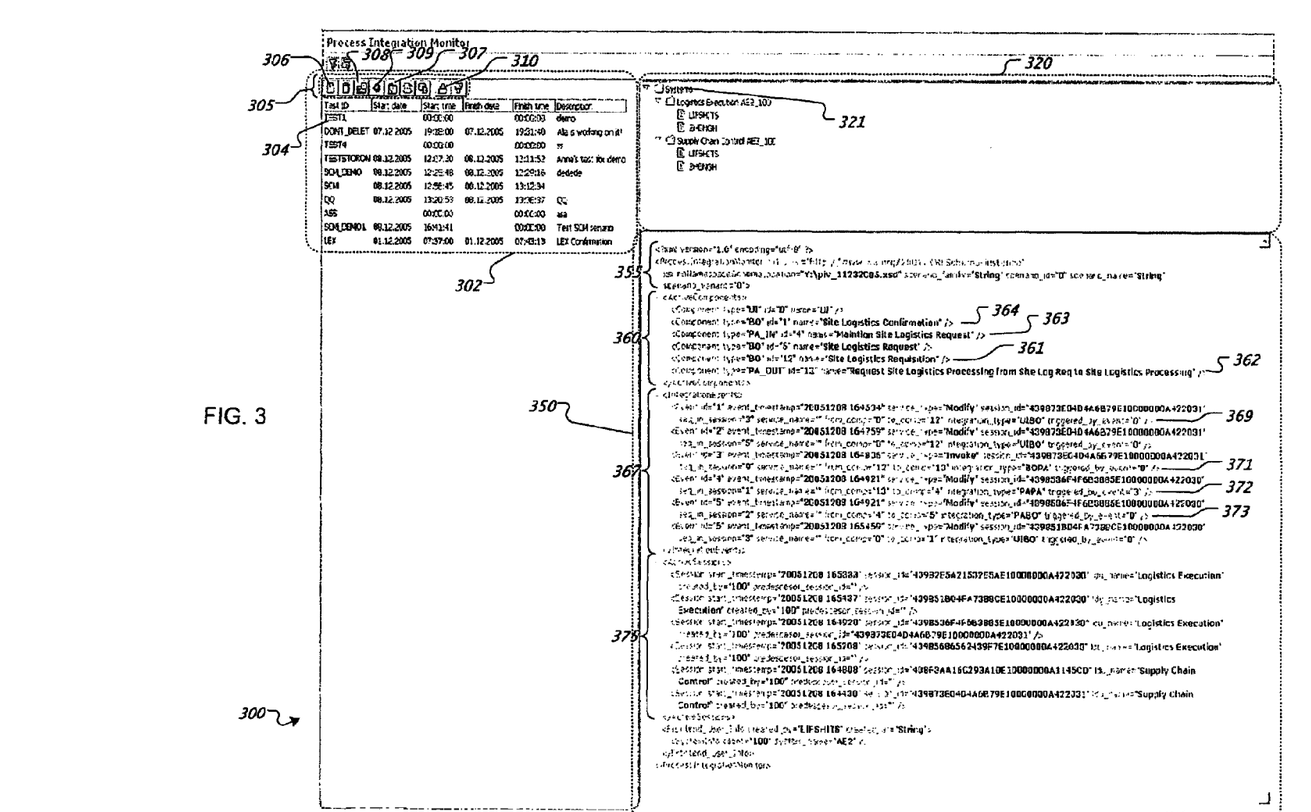
FIG. 3 is a screenshot of a user interface used to initialize and collect integration events using the project integration manager.

FIG. 3 is a screen snapshot 300 of the UI for setting up and collecting integration events through the PIM, according to one implementation. The exemplary screen snapshot 300 comprises four main sections. Section 302 includes user-selectable fields and executable buttons for performing the function of setting up the test registration and activation, including creating or deleting a test, attaching the system landscape, starting and finishing a test, showing the event log window, attaching filtering rules, and downloading event logs as XML files, according to one implementation. Section 320 comprises the system landscape definition, including the application system (e.g. deployable unit (DU)) name, the system name, and the client and backend user name, according to one implementation. A DU may be a piece of software, i.e., it can be operated with the foundation layer on a separate physical system, isolated from other deployment units, and typically contains a set of process components. Examples may be "Purchasing" or "Customer Invoicing." Section 350 comprises a screen area for event log results, where a visualization of the test event log may be created in real-time. Upon first opening the screen 300, section 350 may be blank.

A user may initiate a debugging test by first defining a new system landscape which may or may not be based on an existing landscape. This may be accomplished, for example, by highlighting, such as by selecting with a pointing device (e.g. a mouse), the 'Systems' field 321 as shown in section 320. In the next step of setting test parameters, the user may add a DU to the system landscape by accessing fields associated with the system landscape 321, for example, by right-clicking with a mouse on the 'Systems' field 321. In this case, the user may be prompted with an option to add a DU, for example, from a list of pre-defined DU's that may appear in a pop-up window. The user may select from the list of DU's and add it to the test parameters. Examples of DU's may include 'Catalogue Authoring,' 'Credit Management,' 'Logistics Execution,' and 'Purchasing' services. A new test scenario may then be created, for example, by selecting graphical icons of the type shown in 305 which have executable functions attached to them and are triggered by events such as a mouse click over the icon. In this example, the user may click icon 306, which may present a dialog box containing fields into which the user may enter information such as a 'test ID' and description. The screen-snapshot 300 indicates multiple test ID's in section 302, which may allow the user easy access to those test results by highlighting the appropriate test ID. Examples in section 302 of independent test runs are "TEST1" 304 and "DON'T_DELET".

The user may attach the newly-defined landscape to the newly created test, 'TEST1' 304, by clicking on the 'attach' button 307 which creates an association between the two entities and completes the set-up procedure for this example. The selected test 304 may be initiated, and monitoring of the DU may begin by the user 'starting' the marked test 304; in this example, the screen 300 contains a button 308 for the purpose of starting the test. As soon as the monitoring begins, the screen area 350 may start to fill with events captured by the PIM once the related application is executed. Similarly, a template may appear comprising sections which may be filled with events upon application execution. In the example screen snapshot 300, the area 350 is shown after many integration events have been captured. The uppermost text 355 in area 350 may contain header information relating to the process being run and identifying attributes such as a 'scenario_id.' Listed below the header information 355 are three categories of elements: active component elements 360, integration event elements 367, and active session elements 375. These categories may initially be empty and subsequently fill when appropriate events are captured by the monitor observer 125.

On a separate UI than that used for setting up the parameters of the PIM, a user may execute the program that is being monitored for events. For example, the user may start a scenario test on a Source Code Control (SCC) system, choose SCC BO 'Site Logistics Requisition,' and subsequently, create a new requisition header. Immediately, this interaction may be captured by the PIM and displayed in the event log area 350 of the screen 300. The captured BO element may be added to the captured active component element list 360 as a new entry 361, and a 'Modify' event 369 may be added to the list of integration event elements 367 corresponding to the user's interaction with the application system.

The user may further save their interaction (on the application system UI), the associated events of which may be captured and displayed on the PIM UI in the event log window 350. For example, an outbound PA event 362 may be added to the active component element list; the 'invoke' event of the BO that called to a PA 371 may be added to the integration event element list 367; after releasing the XI queue, the inbound PA event 363 may be added to the active component element list 360; finally, the 'modify' event of LEX BO SLR 372 that is called by the inbound PA event 363 may be added to the integration event element list 367.

The user may further continue their application system test by entering an LEX system and selecting a BO such as 'site logistics confirmation,' and entering a new confirmation header. This information may be immediately captured and displayed in the event log window 350: the SL 'confirmation' BO 364 is added to the active component element list 360, and the 'modify' event 373 corresponding to the creation of a new SL confirmation is added to the integration event elements list 367.

At this point, the user may wish to stop capturing events related to the application system which they are testing. This may result, for example, from finished execution, or errors which prohibit further commands from being executed. In any case, the user may use a 'stop' button 309 to halt recording of events. Subsequently, the user may wish to download the contents of the event log window 350 onto a recording media for further analysis or to assimilate the results on to their programming schema, which they may do by selecting an appropriate action button, for example, button 310.

Figure 4A:
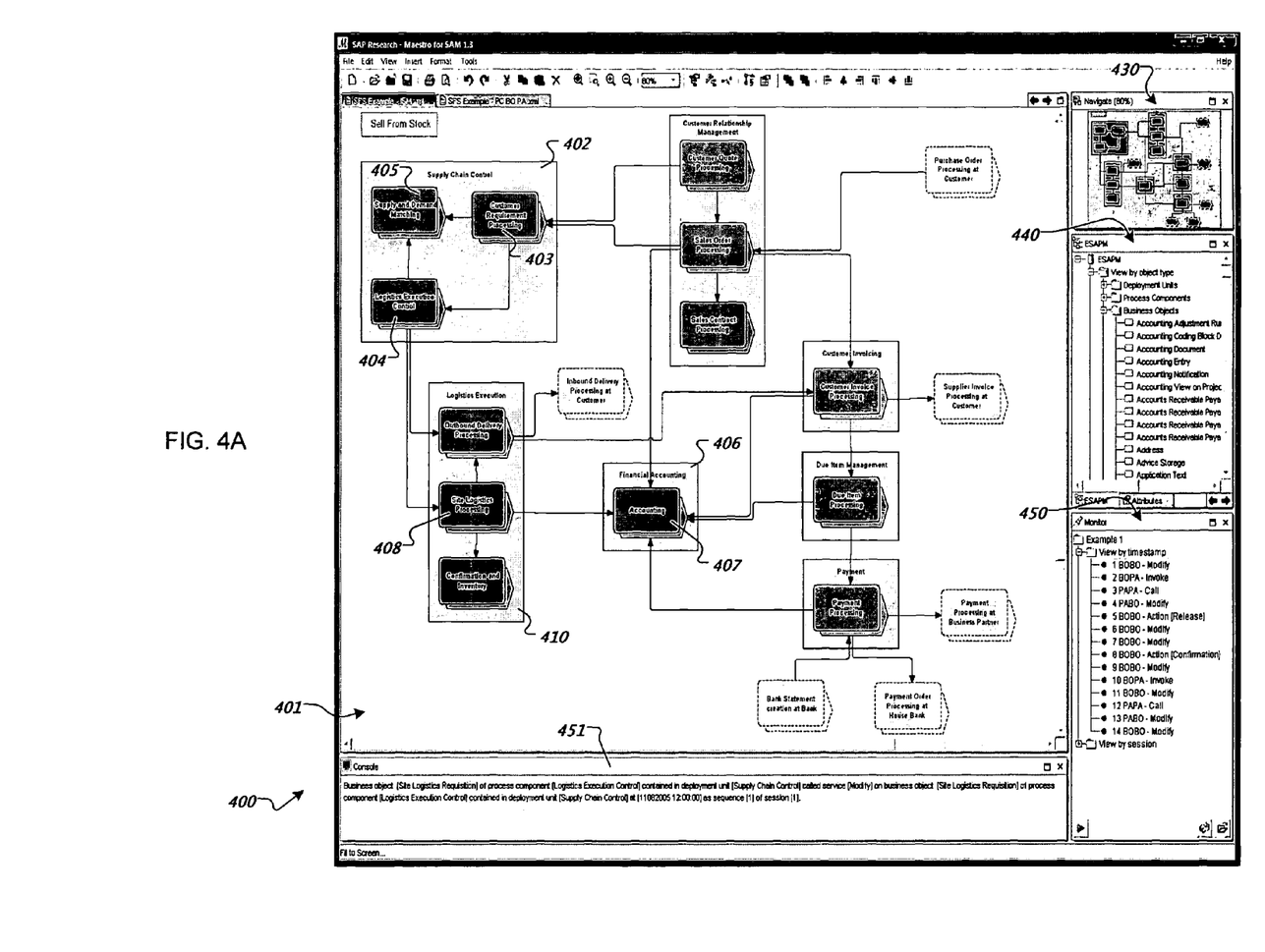
FIG. 4A is a screenshot of an exemplary user interface used to model business processes.

FIG. 4A is a screen snapshot 400 of a business process integration model based on ESA (an exemplary SOA software UI). ESA software may allow a programmer to link services between process components across DU's together in a window 401 (such as 'supply chain control' modeling object 402) that support the requirements of the programmer, as is commonly known in object-oriented programming. Services inter- and intra-operate according to predefined rules or definitions that, when put together may support complex enterprise systems and architectures. Modeling objects may exist within one another, such as the 'logistics execution control' object 404; the number of modeling objects contained within a modeling entity describes the overall granularity of the entity. For example, the supply chain control entity 402 may comprise three objects, 'supply and demand matching 405,' 'customer requirement processing 403,' and 'logistics execution control 404,' whereas the 'financial accounting' entity 406 may only contain one object, 'accounting' 407. In this example 'supply chain control' 402 may be considered to be of higher granularity due to its greater number of objects within a single entity.

The screen 400 comprises a smaller navigation window 430, with which one may select an individual object or entity to work on, a shortcut list of business objects 440 in a directory-like fashion, and a 'monitor' window 450 that may contain event log entries from a test execution like that described in FIG. 3. The console window 451 may allow a user to see detailed information about a particular event selected in the monitor window 450.

Figure 4B:
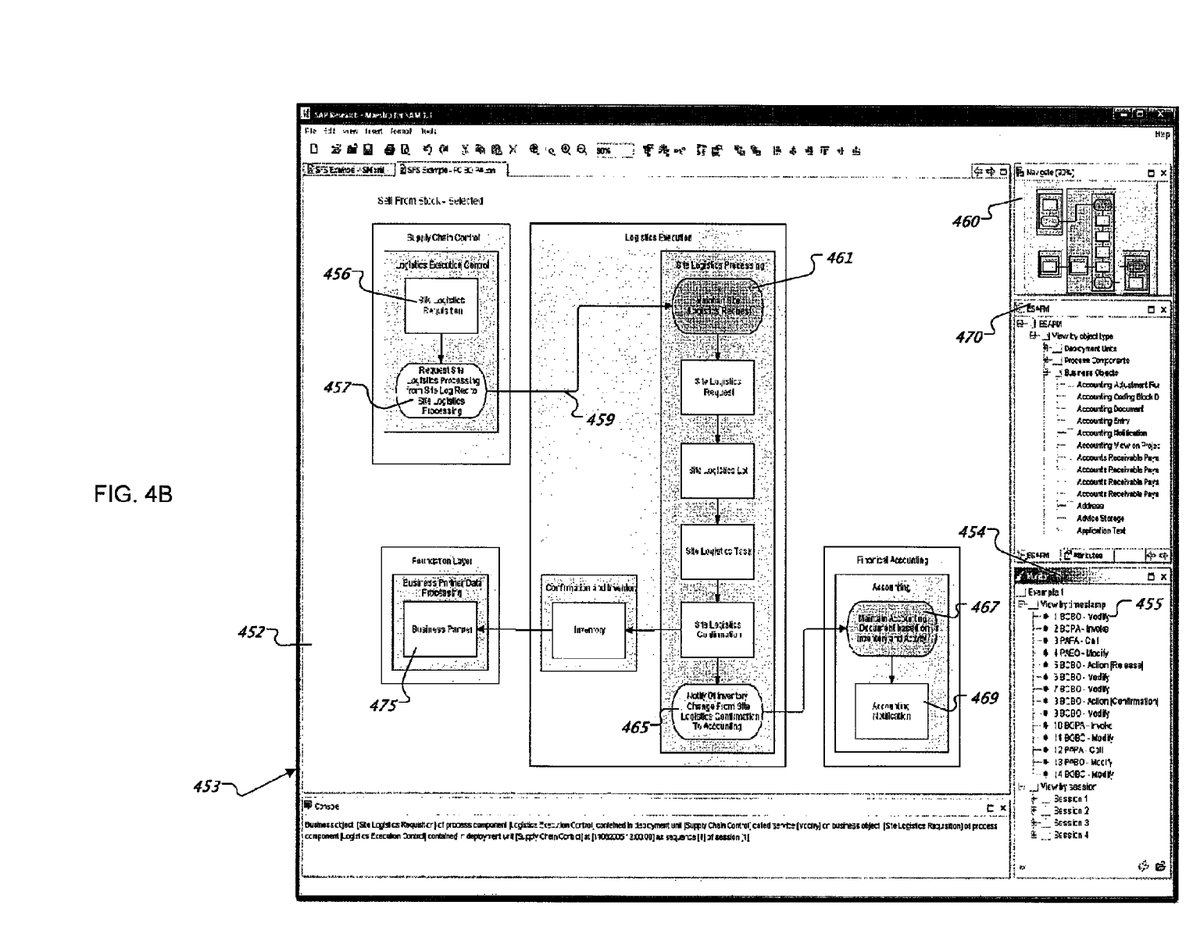
FIG. 4B is a screenshot of an exemplary user interface that integrates model business processes with integration events as the events occur at run-time.

FIG. 4B is a screen snapshot 453 that comprises many of the same functional characteristics as screen snapshot 400, such as a window 452 to view services, a navigation pane 460 to view the current granularity and location of the contents in the window 452, and a monitor window 454. In the example screen snapshot 453, the user has selected a particular event from the monitor window 454, 'BOBO—Modify' 455, a BO to BO interaction. Upon doing so, the window 453 contents have changed from that in FIG. 4A to show the services that were involved when the event 455 was captured. 'Supply chain control' service 402 now shows detailed services structure at a higher granularity than in FIG. 4A, and includes sub-units 'site-logistic requisition' 456 and 'request site logistics processing from site log req to site logistics processing' 457. Interoperability is indicated between the 'supply chain control' 402 and 'logistics execution' 410 services by a connecting line 459. The line 459 may indicate the flow of information from one service to another, at any level of granularity and may include objects such as BO's, for example. The services shown for this event indicate the exact processes that were involved when the event occurred and was captured, thus allowing an operator to visually identify the exact chain of events that led up to, and followed the event. In this example, information may have begun from 'site logistics requisition' 456 and ultimately passed to 'account notification' 469 and 'business partner' 475 BO's.

Objects related to the selected event may appear visually distinct (e.g., highlighted) in the model, such as objects 457, 461, 465, and 467, and may change as the programmer scrolls through the captured events displayed in the monitor window 454. The programmer may navigate the directory of ESA process modeling objects available 470, and add them to the active model, such as by 'dragging and dropping' selected items from the list 470. In this manner, the programmer may visualize other inter- or intra-operability of services as they relate to the selected event 455. In addition, the programmer may select a comfortable level of granularity, or abstraction level, when viewing the process model and the associated event. For example, programmer may highlight two process components on an integration scenario model at a level similar to that shown in FIG. 4A; in this case, the highlighted objects may include 'logistics execution control' 404 and 'site logistics processing' 408. The details or sub-objects that make up the parent class (supply chain control' 402 and 'logistics execution' 410 respectively) may not be necessary to view for some events.

Figure 5:
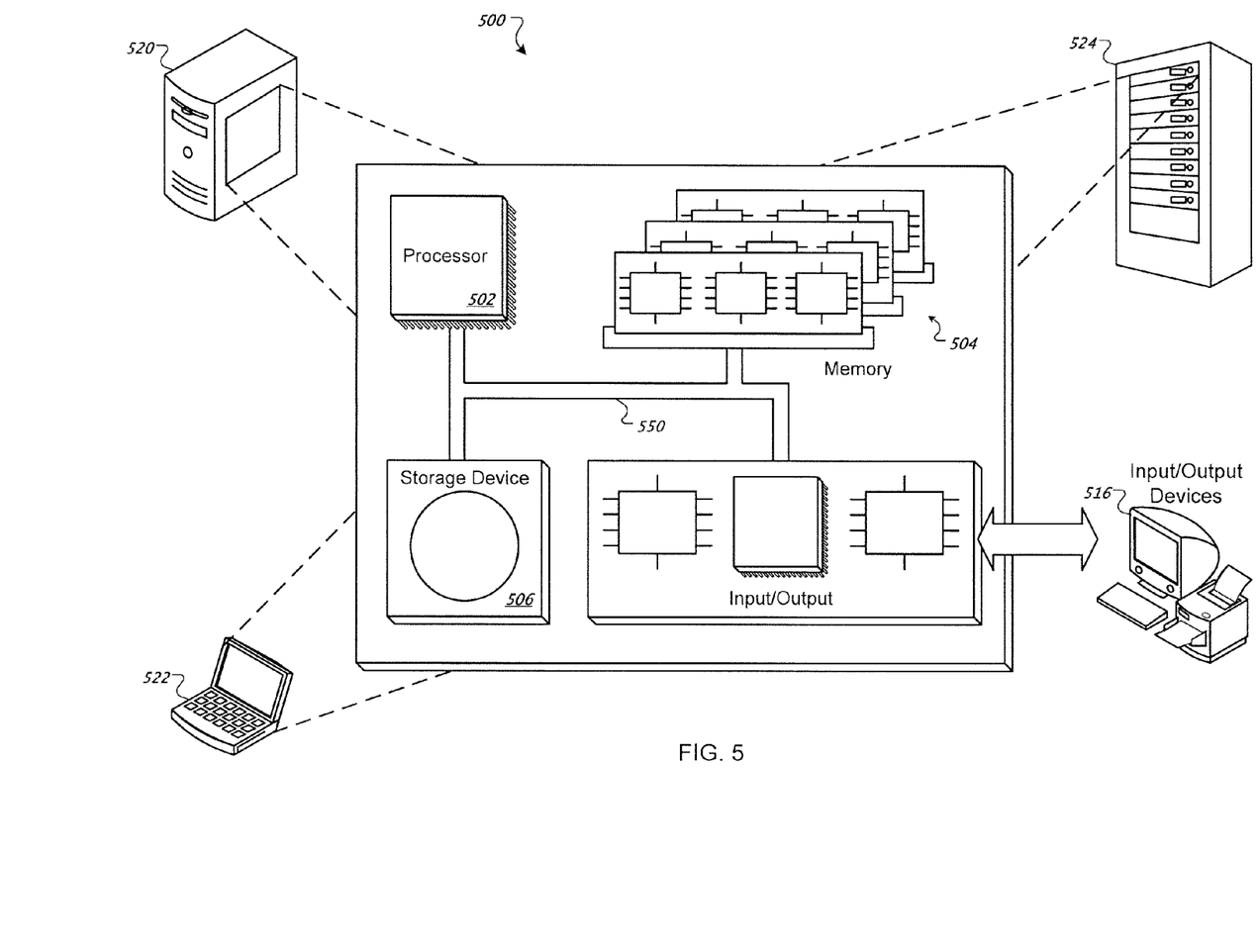
FIG. 5 is a block diagram of a computing device that may be used to implement the systems, methods and tools described in this document, as either a client, as a server(s), or a combination thereof.

FIG. 5 is a block diagram of a computing device 500 that may be used to implement the systems, methods and tools described in this document, as either a client or as a server(s), or a combination of the two. The computing device 500 is intended to represent various forms of digital devices, such as laptops, desktops, workstations, personal digital assistants, servers, blade servers, mainframes, or other appropriate computers or devices.

The computing device 500 includes a processor 502, memory 504, a storage device 506, a high-speed interface connecting to memory 504 and high-speed expansion ports (not shown), and a low speed interface (not shown) connecting to a low speed bus (not shown) and storage device 506. Each of the components 502, 504, and 506 are interconnected using various busses (e.g., bus 550), and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to the high speed interface. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller manages bandwidth-intensive operations for the computing device 500, while the low speed controller manages lower bandwidth-intensive operations. Such allocation of functions is exemplary only. In one implementation, the high-speed controller is coupled to memory 504, display 516 (e.g., through a graphics processor or accelerator), and to the high-speed expansion ports, which may accept various expansion cards (not shown). In the implementation, the low-speed controller is coupled to storage device 506 and the low-speed expansion port. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown. For example, the computing device 500 may be implemented as a standard server 520, or multiple times in a group of such servers. The computing device 500 may also be implemented as part of a rack server system 524. In addition, the computing device 500 may be implemented in a personal computer such as a laptop computer 522. Each of such devices may contain one or more of computing device 500 and an entire system may be made up of multiple computing devices 500 communicating with each other.

Figure 6:
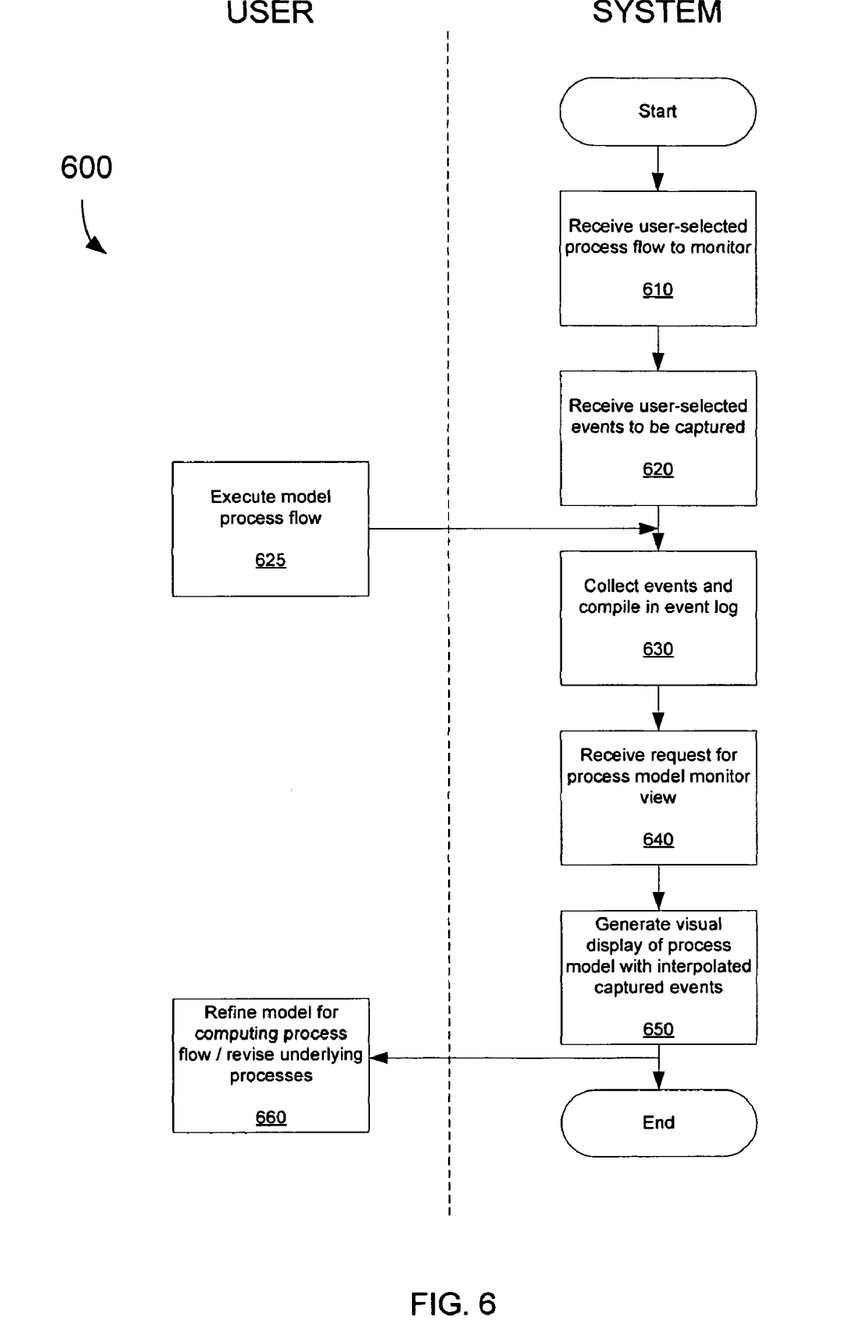
FIG. 6 is a flowchart that generalizes the processes described herein and summarizes the utility of the process model debugger.

FIG. 6 is a flowchart 600 that generalizes the processes described herein and summarizes the utility of the process model debugger. Beginning at step 610, the system 100 may receive a user-selected process flow to be monitored. The process flow may be, in a preferred embodiment, a SOA-type business process flow model that may generate real-life events during the execution of the model.

Next, at step 620, the system 100 may receive user-specified events that may be defined within the process flow, and that may be collected during real-time execution of the process flow. At step 625, a user may execute the process flow to be monitored.

The system 100 may begin collecting events during run-time at step 630. The captured events may be stored in memory or within a log of captured events. Next, at step 640, the system 100 may receive a request to display a process model monitor view. At step 650, the system 100 may generate a visual display that may contain all or parts of the SOA-level process flow component(s), and the captured events interpolated upon the model.

At step 660, the user of the process model debugger may refine the model for computing process flow, based on the results of the captured events. In another embodiment, the user may revise the underlying processes in general, to generate the most effective model for their particular business needs.

A number of embodiments of the invention have been described. Nevertheless, it will be understood that various modifications may be made without departing from the spirit and scope of the invention. For example, the monitor server has largely been described as functioning in a "push" mode, but may be implemented in a pull mode as well. In this case, the server may be actively responsible for fetching and analyzing the new events frequently from every monitored DU. Accordingly, other embodiments are within the scope of the following claims.

What is claimed is:

1. A computer-implemented method of providing a visual display of a run-time operation of a computing process flow, the method comprising:

collecting specified events generated during a run-time operation of a designed computing process flow having a model that defines, at a service-oriented architecture level, which of several predefined computing services are used in the computing process flow and relationships among the predefined computing services that are used in the process flow;

generating, on a display device, a visual display that shows visual representations of:
 (i) all or a portion of the service-oriented architecture-level model for the computing process flow, including at least first, second and third process components, and
 (ii) all or a portion of the collected specified events and showing where, relative to the model, the collected specified events were generated;

receiving an input upon a user selecting an identifier representing one of the events, wherein the first process component includes at least first and second process subcomponents connected to each other, of which only the first process subcomponent was involved when the event was generated, wherein the second process component includes at least a third process subcomponent that was involved when the event was generated, the third process subcomponent connected to the first process subcomponent; and wherein the third process component was not involved when the event was generated; and generating, in response to the input, a revised visual display showing at least a service or services involved when the event was generated, wherein the revised visual display includes the first and second process components, and does not include the third process component; and wherein the revised visual display includes the first process subcomponent and does not include the second process subcomponent.

2. The method of claim 1, further comprising receiving user input specifying run-time events to collect.

3. The method of claim 2, wherein the specified run-time events are executed across multiple application system instances.

4. The method of claim 3, further comprising collecting the run-time events from multiple system component traces generated by the multiple application system instances.

5. The method of claim 2, further comprising analyzing the collected run-time events to determine if they were generated by a particular user.

6. The method of claim 1, further comprising receiving a user input that modifies the computing process flow or relationships among the predefined services based on the generated visual display.

7. The method of claim 1, wherein generating, on a display device, a visual display that shows visual representations of all or a portion of the service-oriented architecture-level model for the computing process flow, and of the collected specified events, comprises using metadata associated with the computing process flow to link the collected events with a corresponding computing process flow.

8. The method of claim 7, wherein using metadata associated with the computing process flow to link the collected events with a corresponding computing process flow comprises matching a run-time method identifier with design-time metadata.

9. The method of claim 1, wherein generating the visual display further comprises using filters that screen the collected specified events according to predefined filtering rules.

10. The method of claim 1, further comprising merging collected specified events generated by computing process flows implemented on one or more servers.

11. The method of claim 1, further comprising generating the visual display substantially simultaneously with collecting the specified events.

12. The method of claim 1, further comprising generating the visual display from a previous run-time operation, wherein previously collected events have been saved in a retrievable file.

13. The method of claim 1, wherein the collected specified events and the computing process flow are displayed on a user interface comprising graphical indicators that highlight the computing process flow related to the collected events.

14. The method of claim 13, further comprising displaying a process sequence of multiple computing process flow components with a collected specified event.

15. The method of claim 13, further comprising receiving a user selection of a level of process flow granularity at which the collected specified events and the computing process flow are displayed.

16. The method of claim 1, wherein the visual display shows the interpolation of collected run-time events, the software models, and the interactions based on a filter criteria, selected from the group consisting of:
    associations occurring during a time period;
    associations between selected business objects;
    associations related to a selected business process; and
    associations occurring during a selected connection session.

17. A system for monitoring run-time events in association with process models comprising:
    an event monitor to collect run-time events generated by system components represented using software models;
    a server for associating the monitored run-time events with the software models and interactions between the software models at a service-oriented architecture level;
    an interface for transmitting an output for display comprising the associations between the collected run-time events, the software models including at least first, second and third process components, and the interactions, and showing where, relative to the software models, the collected runtime events were generated; and
    an input control for receiving an input selecting an identifier representing one of the events, wherein the first process component includes at least first and second process subcomponents connected to each other, of which only the first process subcomponent was involved when the event was generated, wherein the second process component includes at least a third process subcomponent that was involved when the event was generated, the third process subcomponent connected to the first process subcomponent; and wherein the third process component was not involved when the event was generated;
    wherein the interface generates, in response to the input, a revised output showing at least a service or services involved when the event was generated, wherein the revised output includes the first and second process components, and does not include the third process component; and
    wherein the revised output includes the first process subcomponent and does not include the second process subcomponent;
    wherein the event monitor, the server, and the interface are implemented using at least one computer-readable storage device.

18. A computer program product tangibly embodied in a computer-readable storage device, the computer program product including instructions that, when executed, perform operations for providing a visual display of a run-time operation of a computing process flow, the method comprising:
    collecting specified events generated during a run-time operation of a designed computing process flow having a model that defines, at a service-oriented architecture level, which of several predefined computing services are used in the computing process flow and relationships among the predefined computing services that are used in the process flow;
    generating, on a display device, a visual display that shows visual representations of:
        (i) all or a portion of the service-oriented architecture-level model for the computing process flow, including at least first, second and third process components, and
        (ii) all or a portion of the collected specified events and showing where, relative to the model, the collected specified events were generated;
    receiving an input upon a user selecting an identifier representing one of the events, wherein the first process component includes at least first and second process subcomponents connected to each other, of which only the first process subcomponent was involved when the event was generated, wherein the second process component includes at least a third process subcomponent that was involved when the event was generated, the third process subcomponent connected to the first process subcomponent; and wherein the third process component was not involved when the event was generated; and
    generating, in response to the input, a revised visual display showing at least a service or services involved when the event was generated, wherein the revised visual display includes the first and second process components, and does not include the third process component; and
    wherein the revised visual display includes the first process subcomponent and does not include the second process subcomponent.

19. A computer program product tangibly embodied in a computer-readable storage device, the computer program product including instructions that, when executed, perform operations for providing a visual display of a business process integration model, the method comprising:
    monitoring events that are being generated by a business process being executed in a computer system;
    generating a user interface display that concurrently presents at least a modeling area and a monitoring area, the modeling area including at least part of a model defining what services are included in the business process by associating process components with each other, the monitoring area including identifiers for at least some of the events from the monitoring;

wherein the modeling area of the user interface display includes at least first, second and third process components;

wherein the first process component in the user interface display includes at least first and second process subcomponents connected to each other, of which only the first process subcomponent was involved when the event was generated;

wherein the second process component in the user interface display includes at least a third process subcomponent that was involved when the event was generated, the third process subcomponent connected to the first process subcomponent; and wherein the third process component was not involved when the event was generated;

receiving an input upon a user selecting an identifier in the monitoring area representing one of the events; and generating, in response to the input, a revised user interface display in which the modeling area is updated to show at least the service or services involved when the event was generated;

wherein in the revised user interface display, the modeling area includes the first and second process components, and does not include the third process component; and wherein in the revised user interface display, the first process component includes the first process subcomponent and does not include the second process subcomponent.

20. The computer program product of claim 19, wherein:

in the revised user interface display, the third process subcomponent remains connected to the first process subcomponent, by a sub-subcomponent in the third process subcomponent being connected to a sub-subcomponent in the first process subcomponent.

* * * * *